United States Patent [19]

Tanigawa et al.

[11] Patent Number: 4,535,865
[45] Date of Patent: Aug. 20, 1985

[54] CRUISE CONTROL SYSTEM FOR AUTOMOTIVE VEHICLE

[75] Inventors: Kou Tanigawa, Akashi; Jiro Masuda, Kobe; Kazumasa Nakamura, Okazaki; Kazuhiko Hayashi, Toyota, all of Japan

[73] Assignees: Fujitsu Ten Limited, Kobe; Toyota Jidosha Kogyo Kabushiki Kaisha, Toyota, both of Japan

[21] Appl. No.: 685,541

[22] Filed: Dec. 24, 1984

Related U.S. Application Data

[60] Continuation of Ser. No. 614,861, May 29, 1984, , which is a division of Ser. No. 382,413, May 26, 1982, Pat. No. 4,463,822.

[30] Foreign Application Priority Data

| May 27, 1981 | [JP] | Japan | 56-80287 |
| May 27, 1981 | [JP] | Japan | 56-80288 |
| May 27, 1981 | [JP] | Japan | 56-80286 |

[51] Int. Cl.³ ............................................. B60K 31/00
[52] U.S. Cl. ................................. 180/177; 74/866; 180/179
[58] Field of Search ............ 180/179, 178, 176, 175, 180/177; 74/860, 866; 123/352, 353, 354

[56] References Cited

U.S. PATENT DOCUMENTS

| 4,117,903 | 10/1978 | Fleischer et al. | 180/179 |
| 4,133,406 | 1/1979 | Allerdist | 180/179 |
| 4,198,882 | 4/1980 | Kiencke et al. | 74/866 |
| 4,325,336 | 4/1982 | Kuno et al. | 180/179 X |
| 4,421,192 | 12/1983 | Ito et al. | 180/179 |

Primary Examiner—Joseph F. Peters, Jr.
Assistant Examiner—Michael Mar
Attorney, Agent, or Firm—Staas & Halsey

[57] ABSTRACT

A cruise control system for an automotive vehicle, which automatically controls the throttle valve opening to maintain the vehicle speed constant without a driver's operation of the accelerator pedal once the vehicle speed is set to a desired value, is designed so that acceleration at the time of operating an increase set switch or resume switch is increased to ensure a comfortable drive while ascending a long slope. To this end, the cruise control system is provided with an overdrive controller which releases the overdrive at the time of operating the increase set switch and which resumes the overdrive at the time of releasing the operation of the increase set switch, or an overdrive controller which releases the overdrive at the time of operating the resume switch when the vehicle speed at that time is sufficiently lower than the set speed and which resumes the overdrive when the vehicle speed has been restored substantially to the set speed. Further, in the cruise control system which is adapted to prevent a decrease in the vehicle speed during hill climbing by releasing and resuming the overdrive, a timer is provided which is reset when the vehicle speed has been reduced and is set when the vehicle speed has been restored substantially to the set speed. Even if the vehicle speed has been restored to the set speed, resumption of the overdrive is retarded by the set time of the timer.

4 Claims, 5 Drawing Figures

CRUISE CONTROL SYSTEM FOR AUTOMOTIVE VEHICLE

This is a continuation of co-pending application Ser. No. 614,861 filed on May 29, 1984 which itself is a divisional application of application Ser. No. 382,413 filed May 26, 1982, now U.S. Pat. No. 4,463,822.

BACKGROUND OF THE INVENTION

The present invention relates to a cruise control system for an automotive vehicle, commonly referred to as an auto-drive or speed control, which automatically controls the vehicle speed without a driver's operation of the accelerator pedal once the vehicle speed is set to a desired value.

In general, cruise control systems of this kind are roughly divided into those employing a motor type actuator which drives an accelerator link using a motor as a power source and those utilizing a negative pressure type actuator which drives the accelerator link using the intake manifold absolute pressure as a power source. Since the former is disadvantageous in terms of weight, cost and responsivity, the latter, which is free from such defects, has been chiefly employed in recent years.

An increase set function is also known which allows an increase in the vehicle speed, without a driver's operation of the accelerator pedal, by only continuously pressing a switch called an increase set switch, and which permits a constant speed drive thereafter at the speed of when the increase set switch was released. With the conventional cruise control system employing the aforementioned negative pressure type actuator, such a function cannot be sufficiently performed because the desired acceleration cannot be obtained when the driver desires to increase the vehicle speed. That is to say, in this kind of system, acceleration is carried out by introducing the intake manifold absolute pressure 100 percent into the actuator during increase, but since the intake manifold absolute pressure rises with an increase in the throttle valve opening, the actuator generating power gets into equilibrium with the reaction force of the accelerator link at a midpoint of the full stroke, making it impossible to develop an acceleration that meets the driver's requirement.

Another function of the cruise control system is a resume function which, even after releasing a constant speed driving operation by operating a brake switch or the like, allows the vehicle speed to return to its originally set speed, without involving an operation of the accelerator pedal, only by manipulating a switch called a resume switch. With the conventional cruise control system employing the negative pressure type actuator, however, such a function cannot fully be fulfilled because the vehicle speed cannot be restored to the set speed within a desired period of time. Namely, with the cruise control system of this type, in the case where the vehicle speed at the time of operating the resume switch is more than about 10 Km/h below the set speed, the intake manifold absolute pressure is introduced 100 percent into the actuator, but the desired acceleration cannot be developed for the same reason as mentioned previously; namely, much time is required for restoring the vehicle speed to the set one, thus failing to satisfy the driver's demand for a sporty drive.

Furthermore, in the case of ascending a long slope of, for instance, about five percent, using overdrive, since the vehicle speed gradually lowers even if the throttle valve is opened full, a steady speed drive at a desired speed cannot be accomplished. To prevent the reduction of the vehicle speed while ascending a slope, a certain kind of cruise control system is designed so that when the vehicle speed has become lower than the set speed by a predetermined value, for instance, 7 Km/h, the overdrive is released and the transmission is automatically changed over, for example, from fourth gear to third to restore the vehicle speed, and so that when the vehicle speed has returned substantially to the set speed, for instance, about 3 Km/h below the set speed, the overdrive is resumed. With such a method, however, the changeover cycle from the overdrive to the immediately lower gear of the transmission or vice versa may sometimes become extremely short according to the gradient of the slope, so that the vehicle speed is frequently altered, resulting in a very uncomfortable drive. Since the cruise control system is primarily intended to reduce the fatigue of long, high-speed driving, factors providing such uncomfortable driving must be eliminated as much as possible. A solution to this problem is, for example, to release the overdrive while ascending a slope and to continue driving at the immediately lower gear. In this case, however, it is technically difficult to automatically release the overdrive, while detecting whether the slope is upward or downward and its gradient; in addition, driving at the immediately lower speed throughout the ascending of the slope consumes fuel, and hence is uneconomical.

SUMMARY OF THE INVENTION

It is therefore an object of the present invention to provide a cruise control system which is free from the aforementioned defects of the prior art and hence has improved performance.

Another object of the present invention is to provide a cruise control system employing the negative pressure type actuator which is able to develop a desired acceleration during increase in speed.

Another object of the present invention is to provide a cruise control system employing the negative pressure type actuator which is able to restore the vehicle speed to an originally set speed in a short time during the resume operation.

Yet another object of the present invention is to provide a cruise control system which is simple in construction and is adapted to ensure as comfortable driving as possible even on an ascent while minimizing fuel consumption.

Briefly stated, the cruise control system of the present invention is equipped with an overdrive controller which releases the overdrive at the time of operating an increase set switch and which resumes the overdrive at the time of releasing the operation of the increase set switch, or an overdrive controller which releases the overdrive at the time of operating a resume switch when the vehicle speed at that time is sufficiently lower than a set speed, and which resumes the overdrive when the vehicle speed has returned substantially to the set speed. By the operation of such an overdrive controller, during an increase set or resume operation the engine speed is increased to lower the intake manifold absolute pressure, thus enhancing the actuator generating power. Furthermore, the cruise control system of the present invention, which is adapted to prevent reduction of the vehicle speed while ascending a slope by releasing and resuming the overdrive, is equipped with a timer which is reset when the vehicle speed has lowered and is set when the vehicle speed has returned to a set speed so that the resumption of the overdrive is deferred by the set time of the timer even when the vehicle speed has been restored to the set speed.

DESCRIPTION OF THE PREFERRED EMBODIMENTS

Figure 1:
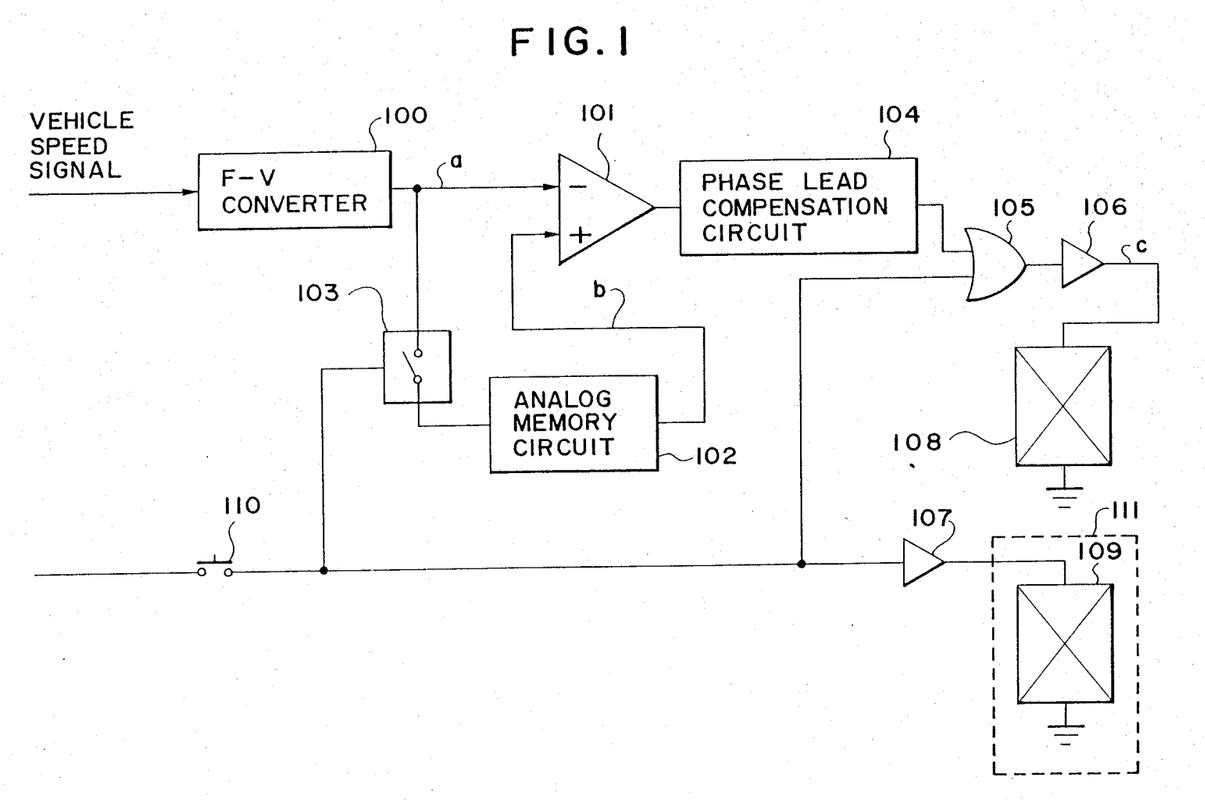
FIG. 1 is a block diagram illustrating the principal part of an embodiment of the present invention.

Referring now to FIG. 1, an embodiment of the present invention will be described. In FIG. 1, reference numeral 100 indicates an F-V converter; 101 designates a comparator; 102 identifies an analog memory circuit; 103 denotes an analog switch; 104 represents a phase lead compensation circuit; 105 shows an OR circuit; 106 and 107 refer to drivers; 108 signifies a control valve solenoid in a negative type actuator; 109 indicates an overdrive cut solenoid; 110 designates an increase set switch; 111 identifies an overdrive controller; and a to c denote signals occurring at respective parts of the cruise control system. A vehicle speed signal is converted by the F-V converter 100 into a voltage a corresponding to a vehicle speed, which voltage is applied to one input of the comparator 101 for comparison with the output voltage b from the analog memory circuit 102. In the analog memory circuit 102 is stored, as a set vehicle speed, a mean voltage corresponding to the vehicle speed during the ON state of the analog switch 103 ganged with a set switch (not shown); therefore, the output from the comparator 101 is representative of an error signal between the current vehicle speed and a set one desired for constant speed driving. This error signal is applied as a control signal c to the control valve solenoid 108 of the negative pressure type actuator via the phase lead compensation circuit 104 for compensating for hysteresis characteristics of the control system and via the OR circuit 105 and the driver 106.

Figure 2:
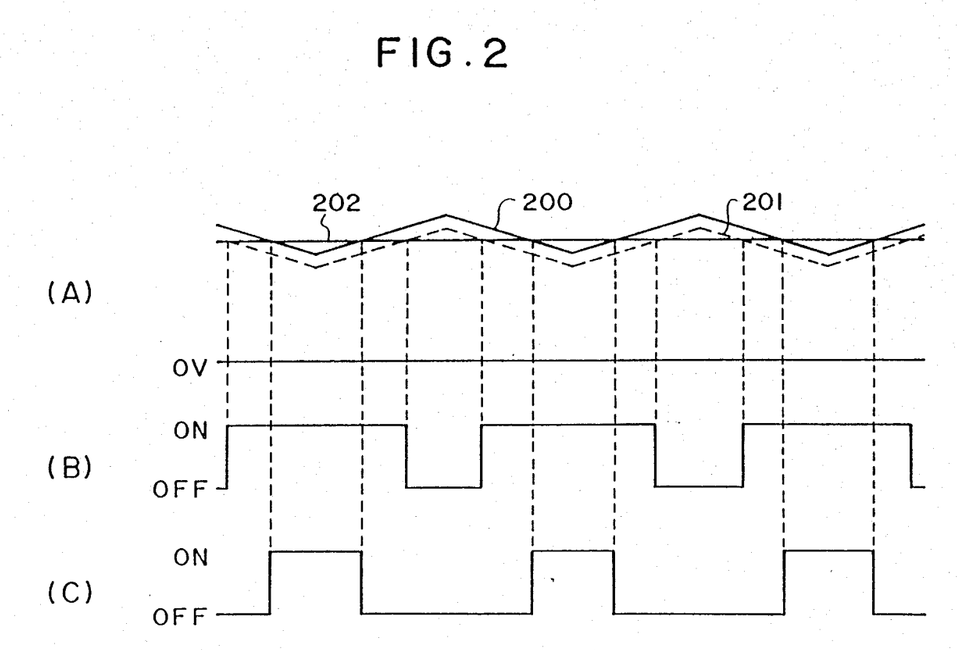
FIG. 2 is a diagram explanatory of the operation of the embodiment shown in FIG. 1.

The output signal a from the F-V converter 100 becomes such, for instance, as indicated by the solid line 200 in FIG. 2(A) when the current vehicle speed is a little higher than the set vehicle speed, and becomes such as indicated by the broken line 201 in FIG. 2(A) when the current vehicle speed is a little lower than the set one. In either case, the output from the F-V converter 100 becomes a DC voltage containing some ripples. The control signal c for the control valve, obtained by comparing the output voltage from the F-V converter 100 with the voltage b corresponding to the set vehicle speed indicated by the straight line 202 in FIG. 2(A), is turned ON and OFF at a ripple frequency as shown in FIGS. 2(B) and (C). The control valve solenoid 108 in the negative pressure type actuator is driven by such a signal.

Figure 3:
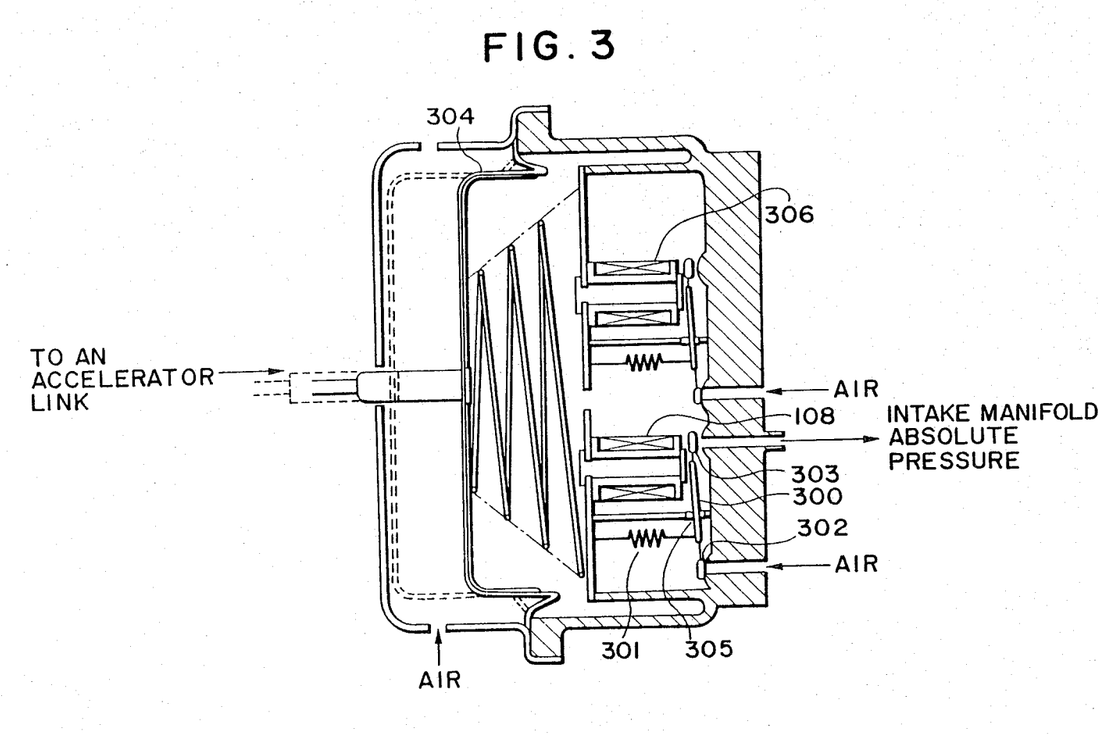
FIG. 3 is a diagram schematically showing the outline of the construction of a negative pressure type actuator.

FIG. 3 schematically indicates the construction of the negative pressure type actuator. While the control valve control signal c is ON, iron pieces 300 are each attracted by the control valve solenoid 108 against a spring 301 to close an air intake valve 302 and to open an intake manifold absolute pressure valve 303, reducing pressure in the actuator. During the OFF period of the control valve control signal c, the iron pieces 300 are pulled back by the springs 301 to open the intake valve 302 and close the intake manifold absolute pressure valve 303, increasing pressure in the actuator. Over a period of operation, the negative pressure in the actuator is determined by the duty ratio of the control signal c so that, by an actuator generating power based on the negative pressure, an accelerator link is driven via a diaphragm 304, performing constant speed drive control. In FIG. 3, reference numeral 305 indicates a fulcrum; and 306 designates release valve coils provided for safety.

With reference to FIG. 1, cruise control system of this embodiment is arranged so that the output from the increase set switch 110 is applied via the OR circuit 105 and the driver 106 to the control valve solenoid 108 as in the prior art. Furthermore, the overdrive controller 111 is provided for releasing and resuming overdrive in accordance with the state of an input electric signal. The output from the increase set switch 110 is provided via the driver 107 to the overdrive cut solenoid 109. Accordingly, upon depression of the increase set switch 110, a current flows to the control valve solenoid 108 to increase the actuator generating power and, at the same time, a current is also applied to the overdrive cut solenoid 109 in the overdrive controller 111 to release the overdrive to effect a gear change, increasing the engine speed to further enhance the actuator generating power. Accordingly, acceleration during speed increase becomes larger than in the past, creating a pleasant feeling.

Upon release of the increase set switch 110, the current supply to the overdrive controller 111 is cut off and overdrive is resumed and, further, the analog switch 103 operates to store a newly set vehicle speed in the analog memory 102, performing constant speed drive at the set vehicle speed thereafter.

The overdrive controller 111 may be of any arrangement if it is able to release and resume the overdrive in accordance with the state of the input electric signal. It is possible to adopt, for instance, such an overdrive controller employed in an automatic transmission vehicle which effects a gear change from overdrive to third gear by means of an electromagnetic clutch. Of course, the present invention is also applicable to a manual transmission vehicle.

As described above, the cruise control system of this embodiment, which has the increase set function, is equipped with the overdrive controller which releases overdrive when operating the increase set switch and resumes overdrive when releasing the operation of the increase set switch. Since the actuator generating power during the increase in vehicle speed is made larger than in the prior art, sufficient acceleration to satisfy the driver's requirement can be obtained, giving the driver a sporty drive.

Figure 4:
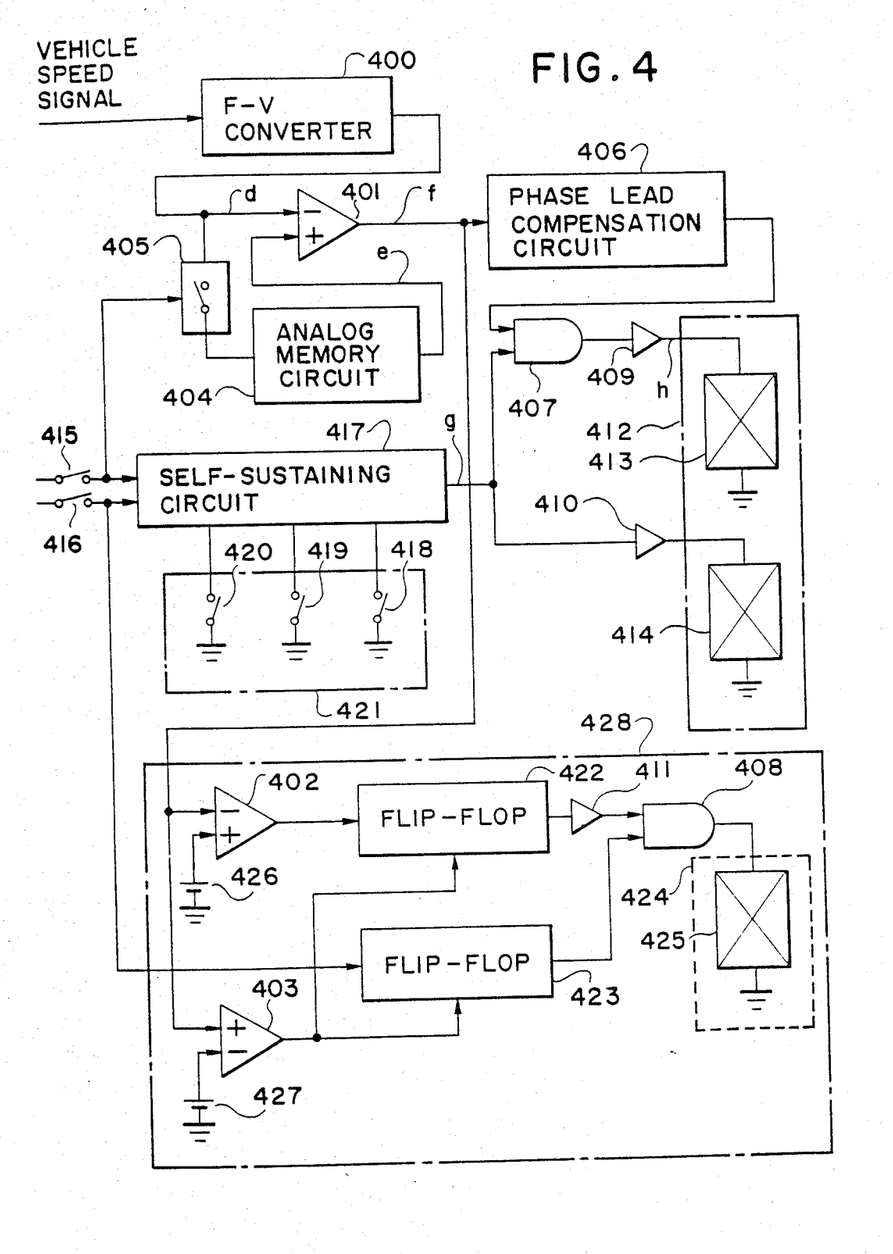
FIG. 4 is a block diagram illustrating the principal part of another embodiment of the present invention.

FIG. 4 illustrates in block form the principal part of another embodiment of the present invention. Reference numeral 400 indicates an F-V converter; 401 designates an adder; 402 and 403 identify comparators; 404 denotes an analog memory circuit; 405 represents an analog switch; 406 shows a phase lead compensation circuit; 407 and 408 refer to AND circuits; 409 to 411 signify drivers; 412 indicates a negative pressure type actuator; 413 and 414 designate its control valve solenoid and release valve solenoid respectively; 415 identifies a set switch; 416 denotes a resume switch; 417 represents a self-sustaining circuit; 418 shows a parking switch; 419 refers to a clutch switch; 420 signifies a cancel signal generator; 422 and 423 indicate flip-flops; 424 designates an overdrive start and stop unit; 425 identifies its overdrive cut solenoid; 426 and 427 denote reference voltages; 428 represents an overdrive controller; and d to h show signals occurring at respective parts.

In FIG. 4, a vehicle speed signal is converted by the F-V converter 400 into the voltage d corresponding to the vehicle speed and applied to the one input of the adder 401, wherein it is added to the output voltage e from the analog memory circuit 404 in the polarity shown. The analog memory circuit 404 has stored therein, as the set vehicle speed, a mean voltage corresponding to the vehicle speed during the ON state of the analog switch 405 ganged with the set switch 415. Accordingly, the output from the adder 401 is representative of an error signal f between the current vehicle speed and the set vehicle speed desired for constant speed drive. By the closure of the set switch 415, the self-sustaining circuit 417 is set and, by its output g, the AND circuit 407 is opened and a current is provided to the release valve solenoid 414 to make the negative pressure type actuator 412 operable. The abovesaid error signal f is applied as a control signal h to the control valve solenoid 413 via the phase lead compensation circuit 406 for compensating hysteresis characteristics of the control system, the AND circuit 407 and the driver 409, starting the constant speed drive operation.

The output signal d from the F-V converter 400 becomes such, for example, as indicated by the solid line 200 in FIG. 2(A) when the current vehicle speed is a little higher than the set vehicle speed, and becomes such as indicated by the broken line 201 in FIG. 2(A) when the current vehicle speed is a little lower than the set vehicle speed. In either case, the output from the F-V converter 400 becomes a DC voltage containing some ripples. The control signal h for the control valve, obtained by comparing the output voltage from the F-V converter 400 with the voltage corresponding to the set vehicle speed indicated by the straight line 202 in FIG. 2(A), is turned ON and OFF at the ripple frequency as shown in FIGS. 2(B) and (C). Accordingly, as is the case with the foregoing embodiment, the negative pressure in the actuator is determined by the duty ratio of the control signal h and, by the actuator generating power based on this negative pressure, the accelerator link is driven via the diaphragm 304, performing the constant speed drive control.

The cancel signal generator 421 in FIG. 4 is to generate a cancel signal to reset the self-sustaining circuit 417, for instance, when a brake pedal is stepped on, a clutch is cut off or a parking brake operates. Upon resetting of the self-sustaining circuit 417, the AND circuit 407 is closed and the current supply to the release valve 414 is cut off, forcibly making the negative pressure type actuator inoperative to gradually decrease the vehicle speed. The resume function is to return the vehicle speed to the original set speed without calling for a driver's operation of the accelerator pedal in such a case. To perform this, the present embodiment is designed so that the self-sustaining circuit 417 is set by the output from the resume switch 416 as in the prior art. At the same time, the overdrive controller 428 is provided which releases the overdrive at the time of operating the resume switch when it is decided that the vehicle speed at that time is sufficiently lower than the set speed, and resumes the overdrive when the vehicle speed has returned substantially to the set speed.

That is to say, in the first comparator 402, the output voltage f from the adder 401 is compared with the first reference voltage 426 set to a value corresponding to about 10 Km/h, by which it is decided whether the current vehicle speed is about 10 Km/h lower than the set speed, and if so, the first flip-flop 422 is set. The second flip-flop 423, which is set at the time of operating the resume switch 416, is provided for deciding whether the resume operation is being carried out. By the AND output of the set outputs of the flip-flops 422 and 423, the overdrive cut solenoid 425 in the overdrive start and stop unit 424 is excited. The overdrive start and stop unit 424 is to release and resume the overdrive in accordance with the state of the input electric signal. The unit 424 may be, for instance, of such an arrangement as is employed in an automatic transmission vehicle which performs a gear change from the overdrive to third gear through an electromagnetic clutch. It is a matter of course that other arrangements, for example, used in manual transmission vehicle can also be used.

With such an arrangement as described above, when the vehicle speed at the time of operating the resume switch 416 is about 10 Km/h lower than the set speed, the overdrive is released substantially concurrently with the operation of the resume switch to effect a gear change, by which the engine speed is increased and the actuator generating power is made larger than in the past. As a result of this, acceleration during the resume operation increases, permitting the vehicle speed to return to the set speed in a short time.

In the second comparator 403, the output voltage from the adder 401 is compared with the second reference voltage 427 set to a value corresponding to about 3 Km/h, and the flip-flops 422 and 423 are reset by the output from the comparator 403 when the vehicle speed has been restored substantially to the set speed. Accordingly, when the vehicle speed has returned almost to the set speed, the overdrive is switched again.

It is also possible to make such an arrangement that, for example, when the vehicle speed has lowered below 40 Km/h, the content of the analog memory circuit 404 is cleared, thereby to inhibit the resume operation when the vehicle speed is below the abovesaid value.

As described above, according to this embodiment, the cruise control system having the resume function is provided with the overdrive controller which releases the overdrive at the time of operating the resume switch when the vehicle speed at that time is sufficiently lower than the set speed, and resumes the overdrive when the vehicle speed has been restored substantially to the set speed. Since the actuator generating power during the resume operation can be enhanced as compared with that in the prior art, the original set vehicle speed can be restored in a short time, giving the driver a sporty drive.

Figure 5:
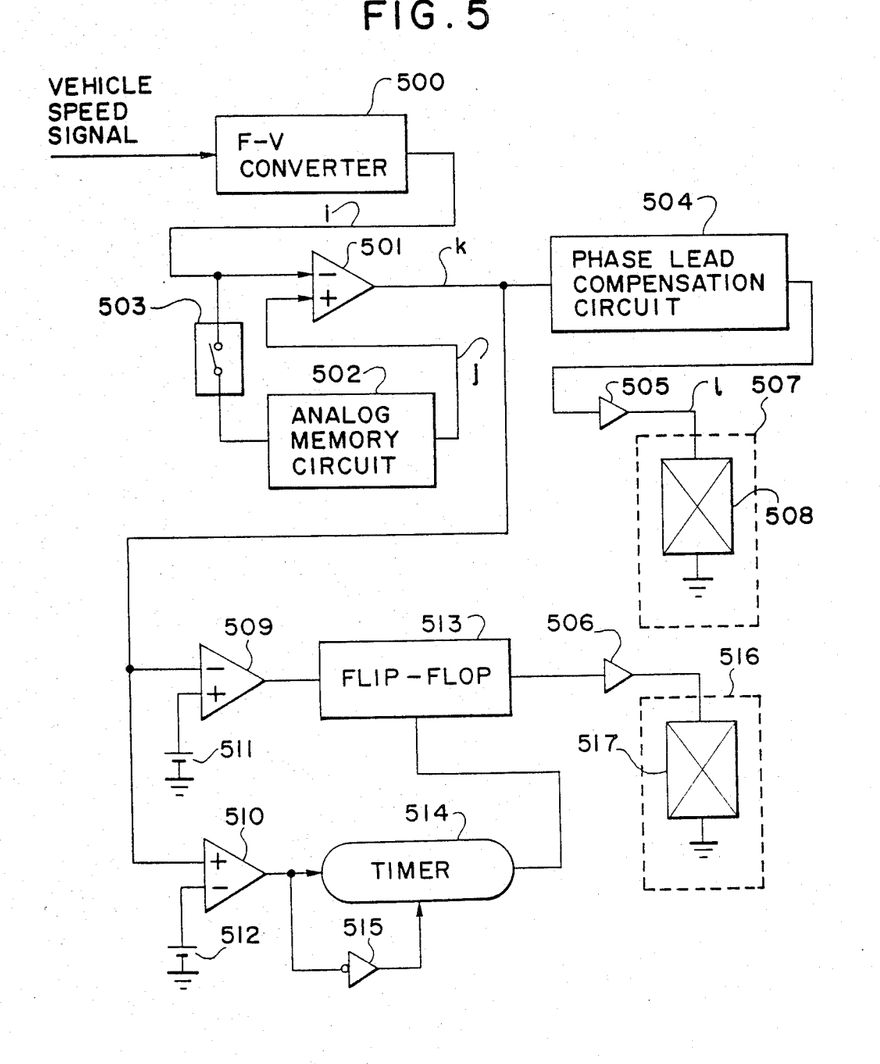
FIG. 5 is a block diagram illustrating the principal part of still a further embodiment of the present invention.

FIG. 5 illustrates in block form the principal part of another embodiment of the present invention. Reference numeral 500 indicates an F-V converter; 501 designates an adder; 502 identifies an analog memory circuit; 503 denotes an analog switch; 504 represents a phase lead compensation circuit; 505 and 506 show amplifiers;

507 refers to a negative pressure type actuator; 508 signifies its control valve solenoid; 509 and 510 indicate comparators; 511 and 512 designate their reference voltages; 513 identifies a flip-flop; 514 denotes a timer; 515 represents an inverter; 516 shows an overdrive start and stop unit; 517 refers to its overdrive cut solenoid; and i to l signify signals occurring at respective parts of the cruise control system.

In FIG. 5, a vehicle speed signal is converted by the F-V converter 500 into a voltage i corresponding to the vehicle speed and is applied to the one input of the adder 501, wherein it is added to the output voltage j from the analog memory circuit 502 in the polarity shown. The analog memory circuit 502 has stored therein a mean voltage corresponding to the vehicle speed during the ON state of the analog switch 503 ganged with a set switch (not shown). According, the output from the adder 501 is indicative of a voltage corresponding to a difference between the current vehicle speed and a set speed desired for constant speed drive, i. e. a voltage k corresponding to an error speed. The voltage k corresponding to the error speed is provided as a control signal l to the control valve solenoid 508 of the negative pressure type actuator 507 via the phase lead compensation circuit 504 for compensating hysteresis characteristics of the control system and via the amplifier 505, carrying out a predetermined constant speed drive control. That is, as is well known in the art, the intake manifold absolute pressure is introduced into the actuator in accordance with the duty ratio of the control signal l and, by the actuator generating power based on this pressure, the accelerator link is driven, performing control to bring the vehicle speed to the set value. Incidentally, it is a matter of course that the actuator may also be an actuator employing the motor system mentioned above.

In the first comparator 509, the error speed corresponding voltage k from the adder 501 is compared with the first reference voltage 511 set to a value corresponding to a speed predetermined as a reduced speed at which the overdrive should be released, for instance, about 7 Km/h. By this comparison, it is detected whether the current vehicle speed has become lower than the set speed by approximately 7 Km/h, and if so, the flip-flop 513 is set. The set output from the flip-flop 513 is applied via the amplifier 506 to the overdrive cut solenoid 517 of the overdrive start and stop unit 516. The overdrive start and stop unit 516 is to release and resume the overdrive in accordance with the state of the input signal as in the case of the automatic transmission vehicle which carries out a gear change from the overdrive to third gear through an electromagnetic clutch, for instance. Upon setting of the flip-flop 513, the overdrive cut solenoid 517 is turned ON to release the overdrive. Accordingly, the vehicle speed that was reduced while ascending a slope is gradually increased.

When the vehicle speed has increased to almost reach the set speed, it is detected by the second comparator 510 which compares the second reference voltage 512 set to a value corresponding to, for instance, about 3 Km/h, with the error speed corresponding voltage k, and the detected output is provided to the timer 514 to set it. The timer 514 is set so that it yields an output "1" at a preset time of approximately 15 seconds after its setting to hereby reset the flip-flop 513. Therefore, even when the vehicle speed has restored substantially to the set speed, the overdrive is not immediately resumed unlike in the prior art but instead the flip-flop 513 is reset only after the lapse of the preset time of the timer 514, by which the overdrive cut solenoid 517 is turned OFF, permitting resumption of the overdrive. Though differing a little with the gradient of the road, if the preset time of the timer 514 should be selected to be about 15 seconds, one cycle of a change in the vehicle speed including a vehicle speed decreasing or increasing time would become longer than approximately 30 seconds and an unpleasant drive by frequent speed changes could be avoided. Moreover, since the overdrive is not released during driving at all times, fuel expense can also be cut down. Incidentally, the timer 514 is reset by the output from the inverter 515 when the vehicle speed is about 3 Km/h lower than the set speed.

As described above, according to this embodiment, the cruise control system, which prevents a slow-down of the speed while hill climbing by release and resumption of the overdrive, is provided with a timer which is reset when the vehicle speed has lowered and is set when the vehicle speed has been restored almost to the set speed, and the resumption of the overdrive is retarded by the preset time of the timer. Accordingly, a comfortable drive during hill climb can be ensured with a simple arrangement. Furthermore, since the overdrive is not released during driving at all times, the cost of fuel is not so much increased.

The present invention is not limited specifically to the foregoing embodiments, and other variations and modifications may be effected. It is a matter of course that the present invention is applicable not only to the auto transmission vehicle but also to a manual transmission vehicle. It is also possible to store the set vehicle speed digitally and to perform the functions of the phase lead compensation circuit, the comparators and the timer through utilization of the arithmetic function of a microprocessor.

It will be apparent that many modifications and variations may be effected without departing from the scope of the novel concepts of the present invention.

What is claimed is:

1. A system for controlling the speed of a vehicle having an accelerator operated by an operator and a transmission, said system comprising:
   means for producing a speed signal corresponding to the speed of said vehicle,
   a memory for inputting, storing and outputting a value corresponding to a selected speed of said vehicle,
   a comparator for comparing the output of said memory and said speed signal and for providing a corresponding output signal when the speed signal is less than said output of said memory,
   an actuator, linked to said accelerator, for depressing said accelerator for increasing the speed of said vehicle in response to an input signal to said actuator,
   shift means for shifting said transmission from a higher gear to a lower gear in response to an input signal thereto, and for shifting back to said high gear after said input thereto ceases,
   increase set switch means for changing said value stored in said memory, in correspondence to the vehicle speed during the operation of the increase means, and for providing said input signal to said shift means, and
   an OR circuit having as inputs the signals corresponding to said output signal of said comparator and to said input of said shift means, and having an output that provides said input to said actuator, wherein, (1) upon operation of said increase set switch means, the speed of said vehicle tends to increase, (2) upon the release of said increase set switch means, a value is stored in said memory corresponding to a value of the vehicle speed during the operation of said increase set switch means, and (3) after said release of said increase set switch means, said actuator is controlled according to the output of said comparator.

2. The system of claim 1, said actuator being of the negative-pressure type wherein said depressing of said accelerator is enhanced by said shifting of said transmission to said lower gear.

3. The system of claim 1, said actuator being of the motor type.

4. The system of claim 1, 2 or 3, wherein said value stored in said memory at said release of said increase set switch means represents the vehicle speed at the time of the release.

* * * * *

UNITED STATES PATENT AND TRADEMARK OFFICE
CERTIFICATE OF CORRECTION

PATENT NO. : 4,535,865
DATED : Aug. 20, 1985
INVENTOR(S) : Kou Tanigawa et al

It is certified that error appears in the above-identified patent and that said Letters Patent is hereby corrected as shown below:

```
Column 4, line 20, after "1," insert --the--.

Column 5, line 5, after "solenoid" insert --,--.

Column 7, line 17, "According" should be --Accordingly--.

Column 8, line 61, after "input" insert --signal--;
          line 64, after "increase" insert --set switch--.

Column 9, line 1, after "input" insert --signal--.
```

Signed and Sealed this

Third Day of December 1985

[SEAL]

Attest:

DONALD J. QUIGG

Attesting Officer

Commissioner of Patents and Trademarks